Nov. 20, 1951     H. G. MORNER     2,575,764
AIR-FILLED UPHOLSTERY AND METHOD OF MANUFACTURE
Filed April 10, 1947
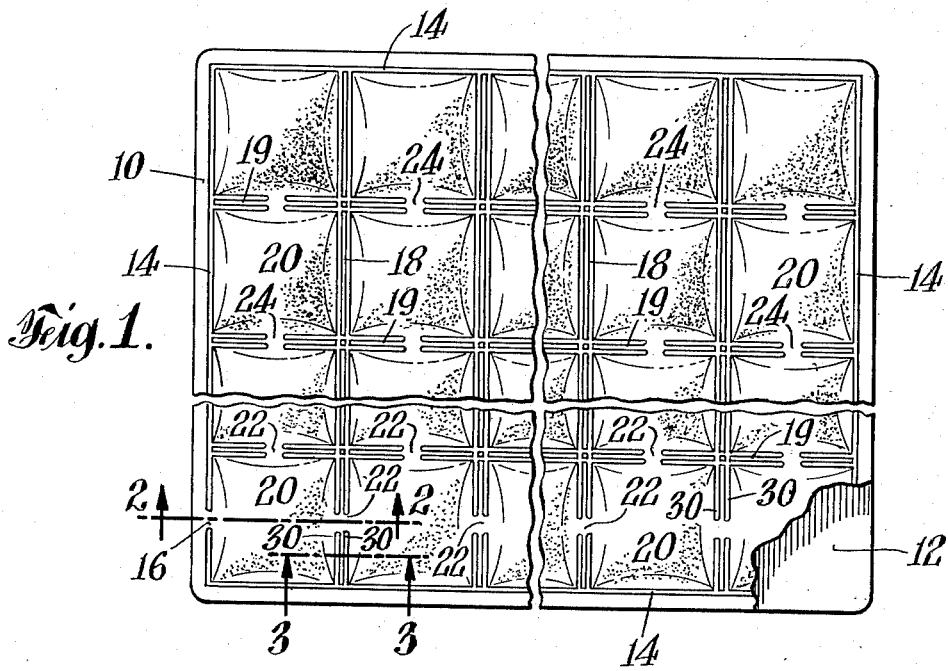
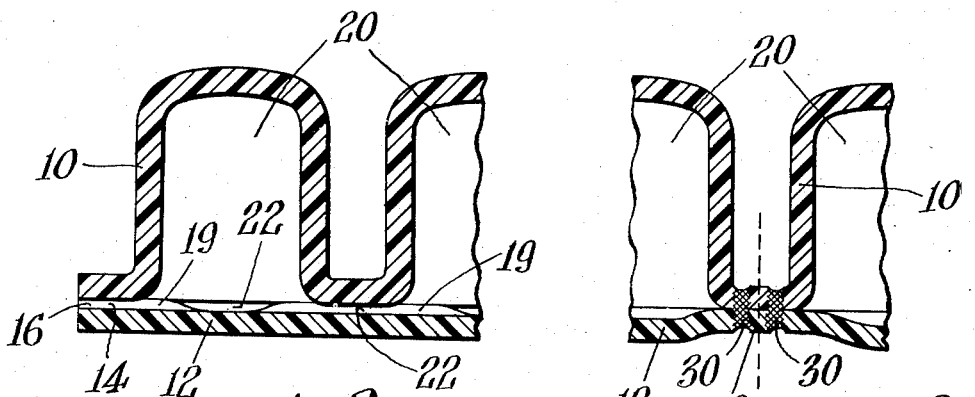
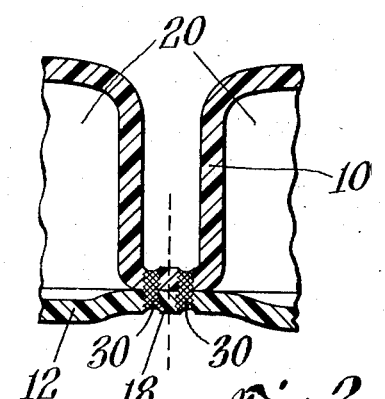
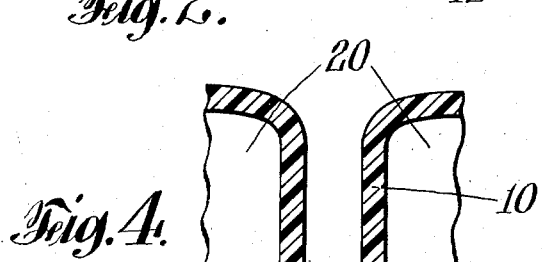
INVENTOR
Hans George Morner.
BY
Morgan, Finnegan and Durham
ATTORNEYS Patented Nov. 20, 1951

2,575,764

UNITED STATES PATENT OFFICE 2,575,764

AIR-FILLED UPHOLSTERY AND METHOD OF MANUFACTURE

Hans G. Morner, New York, N. Y.

Application April 10, 1947, Serial No. 740,549

10 Claims. (Cl. 154—85)

The present invention relates to a novel and improved process of making air-filled upholstery units, and the like.

Objects and advantages of the invention will be set forth in part hereinafter and in part will be obvious herefrom, or may be learned by practice with the invention, the same being realized and attained by means of the processes, steps and combinations pointed out in the appended claims.

The invention consists in the novel steps, constructions, processes, combinations and improvements herein shown and described.

The accompanying drawings, referred to herein and constituting a part hereof, illustrate a preferred form of apparatus for carrying out the process of the invention, and together with the description, serve to explain the principles of the invention.

Of the drawings:

Figure 1 is a fragmentary top plan view of an air-filled upholstery unit in an intermediate stage of the process of the present invention;

Figure 2 is an exaggerated fragmentary sectional view taken on the line 2—2 of Figure 1;

Figure 3 is a similar view taken on the line 3—3 of Figure 1; and

Figure 4 is a view similar to Figure 2 after completion of the process.

The present invention has for its object the provision of an improved process of fabricating air-filled cushions, mattresses and other upholstery units from thermoplastic sheet material. Still another object is the provision of a process of forming such upholstery units which are more durable, capable of wider use, and can be produced more economically than by conventional processes. The invention also provides a rapid, easily executed process for forming a large number of heat-sealed joints between two layers of sheet thermoplastic material, which joint may form the separation between two adjacent air cells formed by the sheet material, and is particularly adapted to large scale, substantially automatic production. The invention also provides an improved process of forming and filling with air upholstery units which comprise a large number of air-filled non-communicating cells. Furthermore, the invention provides a novel and improved heat-seal between two layers of thermoplastic sheets which allows the sheets to be cut into smaller sheets without destroying the efficacy of the seal.

Heretofore, flexible sheet thermoplastic material, such as vinyl acetate-vinyl chloride copolymer, preferably "Vinylite" (VU 1900) ranging in thickness from 0.004" to 0.020" has been used to form the walls of air cells used in air-filled cushions, mattresses, other upholstery units, etc. and the seal between two sheets forming the unit and dividing the unit into cells has been formed by a relatively wide seal, often as wide as one-quarter inch. Such seals are conventionally made by pressing the two sheets of material together between suitable electrodes of an electronic or ultra high frequency generator (generally upwards of 6 megacycles). In those upholstery units which are permanently air-filled and are provided with no air valve, there is the necessity of proceeding with the seal to the point where only a single opening is provided for introduction of air and then this single opening must be closed to retain the air. Where the unit consists of a large number of cells, there are a correspondingly large number of openings to be sealed if the cells are to be non-communicating. Sealing such a large number of openings with good seals and without damage to the sheet material, as well as the problem of filling the cells with air and maintaining them filled while they are sealed has also created difficulties which are solved by the present invention.

The invention provides a new and improved process which is preferably carried out in the following general manner:

A sheet of flexible thermoplastic air-impervious material is molded or otherwise formed to provide cell-like depressions of the proper size and arrangement. Each of the depressions may conveniently be substantially in the form of a cube, with one side missing, the depressions being spaced closely together so that only narrow straight margins are provided between adjacent rows of these cubes. The molded sheet is trimmed to the desired size and is juxtaposed on a similarly shaped piece of similar material. The two sheets are then joined together by heat-sealing along the margins of the sheets and along the lines of the straight narrow margins between adjacent rows of cells or cubes, thus providing the sixth side to each of the cubes.

To facilitate filling of the cells with air under slight pressure (preferably less than 1 p. s. i.) one of the marginal rows of cells is incompletely sealed to provide narrow intercommunicating vents between adjacent cells in this row, and each of the rows at right angles to the first row is provided with similar vents between each other and the first row. Additionally, the cell at one end of the first row is incompletely sealed to provide a vent hole through which the entire set of cells may be filled, the first row acting as a distribution manifold for the other rows of cells. When the proper pressure has been reached in all of the cells the main vent, at the margin of the end cell is sealed to trap permanently within the unit the desired amount of air, and thereafter the intercommunicating vents between the cells, or any part of the vents may be sealed thereby rendering all or any desired part of the cells non-communicating.

While any form of heat-seal between the sheets of material may be used, I prefer to use a plurality of parallel, very narrow seals as the heat necessary to effect the seal is more rapidly dissipated and there is less danger of burning or melting the thermoplastic sheet material. The multiple seal may be interrupted to provide the vent passages, and when these vent passages are sealed, some overlapping of the first and second heat-sealing operations is unavoidable. By using a seal which is narrow and staggered with respect to the gaps in the multiple seal forming the vent, the overlap is reduced, the danger of burning or seriously weakening the sheet material is minimized, and due to the narrow seals involved, there is little danger of trapping air bubbles in the seal or otherwise forming imperfect seals.

Where the multiple seal is used, it also forms an effective guide for cutting in case it is desired to cut out a single cube or cell or if it is desired to separate a number of cubes from a larger unit, thereby making it possible to cut smaller units from large stock sizes without waste. The multiple seal also insures that on cutting out one or more cells or cubes a margin is left to which a repair cell or group of cells may be attached by cementing or otherwise.

If desired, one or both of the sheets of thermoplastic material may be colored or embossed and it is thus possible to produce cushions, one or both sides of which have an ornamental appearance, such as the appearance of alligator skin, leather, textile fabric, etc.

It will be understood that the foregoing general description and the following detailed description as well are exemplary and explanatory of the invention but are not restrictive thereof.

Referring now in detail to my preferred manner of carrying out the process of the present invention, as well as my preferred form of air-filled unit as embodied in a cushion and as illustrated in the accompanying drawings:

I prefer to use a flexible, air impervious, thermoplastic sheet material which is durable and not rapidly deteriorated by weather and other usual agents such as water, sunlight, normal temperatures, oils, soap, etc. For this purpose, I find the plasticized vinyl resins, such as the vinyl chloride—vinyl acetate copolymer to be well suited. I prefer to use the material in sufficient thickness so that it is not unduly subject to tearing, puncture and other injury and has good air-retaining properties. Ordinarily, I use sheet material which is at least 0.004" thick and I prefer material having a thickness of 0.008" or 0.012", while thicknesses in excess of 0.020" are generally not desirable on account of the added weight and cost.

The cellularly indented sheet 10 may be formed in any desired manner and is conveniently formed by heating the sheet material, clamping it along its marginal edges over a suitable form having prismoidal, and preferably cubical depressions therein, closely adjacent each other and extending over substantially the entire surface of the form. By differential fluid pressure, while the sheet is heated, as by steam pressure, the sheet material is expanded and formed into the cellular depressions and held in that condition momentarily. Thereafter, the fluid pressure differential is relieved and the sheet, still in the depressed cells is chilled to set it in its formed condition, thus providing a cellular sheet 10, all of the cells remaining open on the same one side.

A generally similar sheet of material 12 is provided to form the closure for the open sides of the cells on the first sheet, except that the sheets are usually assembled with the second sheet in its original flat condition.

As the first usual step in this assembly operation, the formed sheet 10 and the unformed sheet 12 are heat-sealed around their marginal edges, as at 14, to locate the pieces relatively to each other and form their permanent bond. The seal 14 is interrupted at 16 to provide an inlet vent through which the cushion may be filled with air at a later stage.

Thereafter, the rows of cubes are heat-sealed along the margins 18, between the adjacent rows of cells 20. The series of adjacent, alined cubical cells 20 along one marginal edge (the bottom edge in Figure 1) are likewise provided with intercommunicating vents 22 by which air entering through vent 16 may pass along one edge of the cushion from cell to cell. On a side opposite the margin, the marginal row of cells is provided with vents 22 leading to an individual cell and the other cells in the rows extending at right angles to the marginal row are connected thereto by the vents 24 formed by the interruption of the heat-seal. These rows are isolated by the seals 18 while the air from the marginal row may be introduced through the vents 22.

The next step is the sealing of the vent 16 after the upholstery unit has been filled with air under slight pressure. Thereafter, the intercommunicating vents 22 and 24 are heat-sealed to close them and render them non-communicating, thereby isolating the cells 20 from each other.

Preferably, the seal lines 18 and 19 are multiple seals, each being formed as at least two narrow heat-sealing lines. Exemplarily, each of the seal lines 30 is approximately 0.050" to 0.100" wide, for material not exceeding about 0.020" thick and the two illustrated seal lines 30 are separated from each other by an unsealed space of from about 0.75" to 0.200" wide. The ends of the seal lines 18 and 19 intersect the marginal seal 14 so that the cubical cells 20 are completely isolated from each other as well as from the outside air.

In this condition, the sheets 10 and 12 provide the vent 22 as shown in Figure 2, while the seal lines 18 seal the sheets, as at 30, along the major length of the line.

Thereafter, the vents 22 and 24 are sealed to prevent intercommunication of the cells 20. The vents 22 and 24 are about ¼" to ½" long and the unsealed portion between the multiple lines of seal 30 is from 0.075" to 0.200" wide. Under such conditions the final seal need be only from ⅜" to ¾" long and from 0.100" to 0.250" wide and accurately registered to overlap substantially equal at each corner of the vent. Thus the full area of the final seal is relatively small, and is particularly small relatively to its perimeter so that using a short sealing time and relatively intense heat or heavy ultra high frequency current, the heat-seal is accomplished without the danger of melting or burning and the seal is rapidly cooled after the application of power or heat is discontinued so that the seal is rapidly chilled below the thermoplastic point without injury to either sheet 10 or 12.

The cushion or other unit is now assembled and ready for use, if its external dimensions do not require cutting it into smaller units.

The invention in its broader aspects is not limited to the specific process and steps shown and described but departures may be made therefrom within the scope of the accompanying claims without departing from the principles of the invention and without sacrificing its chief advantages.

What is claimed is:

1. An air-filled upholstery unit comprising two sheets of flexible air-impervious thermoplastic material joined together along a plurality of sealing lines which divide the space between the sheets into a plurality of air-filled cells, the sealing lines near the margins of the sheets forming a complete seal for air in the space between the sheets and providing at least one marginal row of non-communicating cells around the edge of the unit, the other sealing lines joining the sheets being interrupted to provide air vents from one air cell to an adjacent air cell.

2. An air-filled upholstery unit according to claim 1 in which said cells are cubical and are formed in one of the sheets and the sealing lines comprise multiple narrow seals.

3. An air-filled upholstery unit comprising two sheets of flexible, air-impervious material sealed together along a marginal portion and along a plurality of intersecting lines which divide the sheets into a plurality of rows of air-filled cells, said intersecting lines of sealing being interrupted to provide vents interconnecting one marginal row of air cells, and other vents interconnecting the cells in each row extending laterally from the marginal row with one of the cells of the marginal row, whereby air in the cells of the marginal row is distributed to the laterally extending rows of cells, and subsequent closure of the vents by sealing will render the cells non-communicating.

4. An air-filled upholstery unit as claimed in claim 3 in which the cells are substantially cubical and the intersecting lines of sealing intersect at right angles.

5. The process of forming air-filled upholstery units from two sheets of air-impervious, flexible, thermoplastic material, at least one of which is shaped to form air-retaining cells which comprises, sealing the sheets adjacent their edges leaving a vent through which the space between the sheets may be filled, joining the sheets by sealing along other intersecting lines around the margins of the cells, the intersecting lines being interrupted to provide vents by which all of the cells may be filled with air from the first vent, closing the first vent by sealing with all of the cells filled with air and later closing other vents whereby the flow of air from one cell to another is prevented.

6. The process as claimed in claim 5 in which a marginal row of cells is provided with intercommunicating vents, the sealing lines intersect at right angles and the other cells are in rows which extend laterally from said marginal row and the cells of each lateral row communicate with each other and with one cell of the marginal row.

7. The process as claimed in claim 6 in which the intersecting lines of sealing are formed as multiple narrow seals and the cells are rendered non-communicating by sealing the vents by a seal which overlaps the ends of the multiple narrow row heat-seals at each gap.

8. The process as claimed in claim 7 in which the multiple narrow seals are spaced slightly to provide a narrow unsealed portion between the seals of each line.

9. The process of forming air-filled upholstery units from two sheets of flexible, air-impervious, thermoplastic material, one of which is shaped to form air-retaining, substantially cubical cells having their sides alined and closely adjacent each other and having one open side each to be closed by the other sheet which comprises sealing the sheets peripherally around the group of cells, except for a vent through which air may be introduced into all the cells, sealing the sheets along intersecting lines between the cells whereby each cell is individually surrounded by a joint connecting its open side to the other sheet, the intersecting seals between the cells being interrupted to provide intercommunication between all of the cells, and thereafter sealing the first vent and then the vents providing the intercellular communication.

10. The process as claimed in claim 9 in which the intersecting seals each comprise a plurality of narrow sealed linear portions spaced by a narrow unsealed portion.

HANS G. MORNER.

REFERENCES CITED

The following references are of record in the file of this patent:

UNITED STATES PATENTS

| Number | Name | Date |
| --- | --- | --- |
| 802,526 | Russell | Oct. 24, 1905 |
| 1,498,975 | McLeroth | June 24, 1924 |
| 1,625,582 | Anderson | Apr. 19, 1927 |
| 2,262,493 | Guinzburg | Nov. 11, 1941 |
| 2,354,714 | Strickland | Aug. 1, 1944 |
| 2,392,695 | Rohdin | Jan. 8, 1946 |